United States Patent Office 3,011,415
Patented Dec. 5, 1961

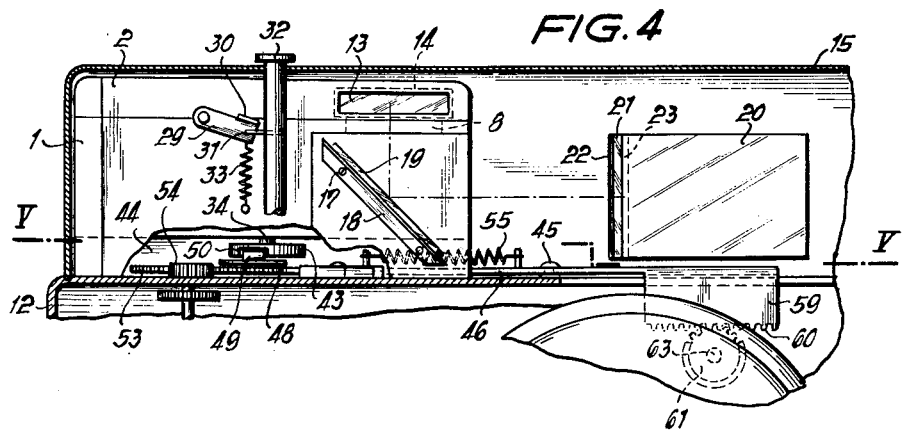

3,011,415
PHOTOGRAPHIC CAMERA WITH A BUILT-IN ELECTRICAL LIGHT METER
Oskar Fischer, Volkmarode, and Paul Greger, Braunschweig, Germany, assignors to Voigtländer A.G., Braunschweig, Germany, a corporation of Germany
Filed Mar. 4, 1960, Ser. No. 12,736
Claims priority, application Germany Mar. 28, 1959
8 Claims. (Cl. 95—10)

This invention relates to still cameras provided with means for automatically pre-setting the adjustment of an exposure condition of the camera in accordance with the indication of an exposure meter, and, more particularly, to such a still camera having a built-in exposure meter and sensing means, coupled to an exposure condition setting means and effective, upon actuation of a shutter release key, to sense the indication or indicating position of the exposure meter and correspondingly control the adjustment of the exposure condition setting means.

As is known to those skilled in the art, the deflection of an exposure meter pointer is non-linear, in that, for equal incremental changes in light values, the incremental changes in the position of the pointer are unequal. Thus any sensing means or the like, positioned in accordance with the indication of the exposure meter, will correspondingly have a non-linear movement. It is therefore not possible to couple such sensing means or device directly to a camera setting means which is to be adjusted in accordance with a linear scale.

There are many known arrangements by means of which the non-linear movement, or non-linear adjusting path, of an exposure meter sensing device can be converted into linear movement of a camera setting means operatively associated therewith. It is also known to provide a special construction of the movable portion, such as the pointer, of an exposure meter, or a special construction of the sensing means positioned by such movable element, so that the sensing means will have a linear movement responsive to an indicating movement of the exposure meter and thus can be coupled directly to a camera setting means adjustable in accordance with a linear scale.

The present invention is directed to simple and inexpensive means whereby non-linear movements of a sensing device, corresponding to non-linear movement of a movable part of an exposure meter in accordance with linear changes in light values, are converted into linear movements of a camera setting means corresponding to such linear changes in light value.

More particularly, the light value responsive movement of a movable part of an exposure meter is arrested at the start of actuation of a shutter release, and the position of such movable part of the exposure meter is sensed by a sensing device having a corresponding non-linear motion about a rotatable shaft. Simple and inexpensive coupling means are provided to convert rotation of this shaft into a linear longitudinal movement of a slide coupled with a camera setting device. One portion of the coupling is connected for movement with the aforementioned rotatable shaft, and the other portion of the coupling is connected for movement with the movable slide.

Preferably, the coupling device comprises a pair of rotatable members, one rotatable with the shaft of the sensing device and the other rotatable responsive to movement of the slide. The coupling between these two members comprises an elongated rib on the one member slidably engaged in an elongated mating groove on the other member. One of the two interfitting elements, the rib or the groove, extends diametrically of the axis of rotation of its associated member, whereas the other element extends parallel to a diameter through the axis of rotation of its associated member but radially spaced from such axis.

More particularly, in a preferred embodiment of the invention, the coupling member connected to the shaft of the sensing means has a longitudinal groove in a surface thereof, this groove extending parallel to a diameter through the shaft of the sensing device but being radially off-set from the axis of such shaft. The other coupling member, rotatable in correspondence with movement of the slide, has a rib formed thereon extending diametrically of its axis of rotation and interfitting in the groove of the other member. The result is that non-linear movement of one coupling member results in linear movement of the other coupling member, or vice versa. By proper selection of the radial off-set of the groove, for example, the difference in the degree of movement of the two coupling members can be made to be such that the movement of the slide will correspond linearly to the changes in light value, and thus the camera setting means can be adjusted linearly in correspondence with the changes in light value.

The exact form of the coupling means may be varied. For example, the shaft of the sensing means may have secured thereto a diametrically or radially extending arm having an elongated slot therein receiving a driver fastened to the slide. As a further variation, the coupling rib can be oscillatably mounted in a bearing on the slide and engaged, for example, in an opening of the drive shaft mating with the coupling rib. This opening can, if desired, be eccentric to the axis of the shaft of the sensing device.

As a further feature of the invention, the sensing means and its associated parts actuating the camera setting means can be coupled with the actuating mechanisms for the shutter release and for the film transport in such a manner that, upon transport or advance of the film, the motion conversion arrangement is brought into a starting position from which it is released, upon commencement of actuation of the shutter release, to effect the adjustment of the camera setting means.

For an understanding of the invention principles, reference is made to the following description of a typical embodiment thereof, as illustrated in the accompanying drawings. In the drawings:

FIG. 3 is a sectional view, on an enlarged scale, of the sensing device, a pointer of the exposed meter, and the sensing device element cooperable with such pointer, the parts being shown in a position different from that shown in FIG. 2;

FIG. 4 is a partial sectional view of a still camera in the cover of which is mounted the housing shown in FIGS. 1 through 3;

FIG. 5 is a sectional view, on the line V—V of FIG. 4, illustrating the coupling of the sensing device to a camera setting means in the still camera;

Figure 1:
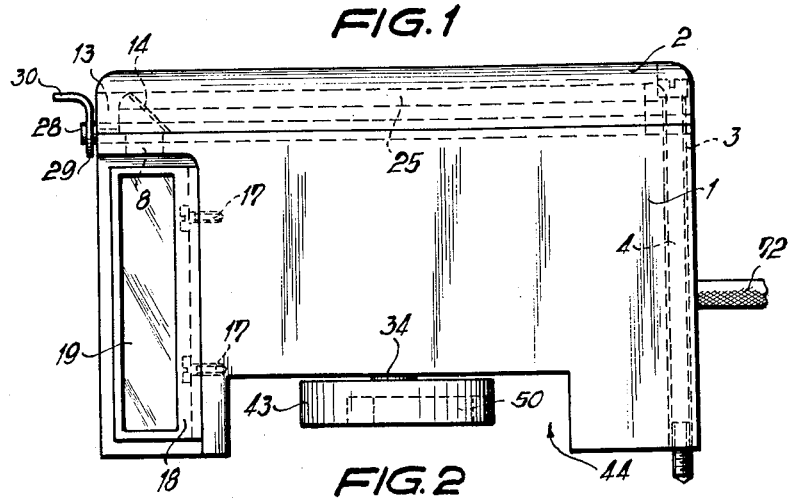
FIG. 1 is a side elevational view of a housing adapted to be mounted in the camera body and containing an electric exposure meter and a sensing device.

Referring to FIGS. 1 through 4, a housing 1, containing an electric exposure meter and the device for sensing the position of the exposure meter, is shown as closed by a cover 2 which may consist of transparent plastic and is fastened to the housing by screws 4 engageable in holes 3 (FIG. 2) of the housing. As shown in FIG. 1, two of these screws can, for instance, extend completely through the housing 1 and have the further function of fastening the housing 1 to the body 2 of the camera shown in FIG. 4.

Two pointers 6 and 7, illustrated as perpendicular to each other, are secured to move with the movable coil 5 of the exposure meter. A window 8 is positioned in the housing 1 in the path of movement of the pointer 7, and has a transparent pane 9 with its two end zones 10 and 11 colored, respectively green and red, for example, the pointer 7 being positioned in one of these end zones at each extremity of its deflection range. The pane 9 and the end of the pointer 7 adjacent thereto can be seen in the image field of the view finder of the camera when the housing 1, together with its cover 2, is fastened to the camera body 12 as partly illustrated in FIG. 4.

Figure 6:
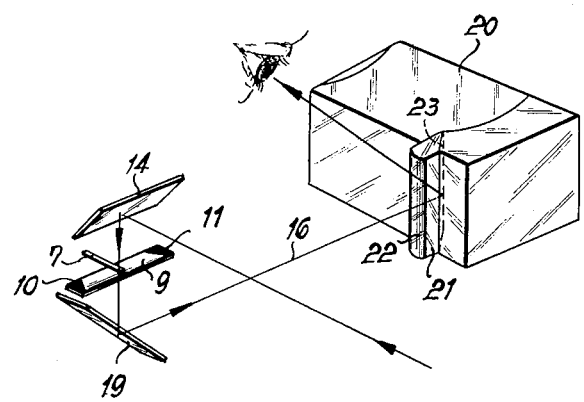
FIG. 6 is a perspective diagrammatic view of a camera view finder and an arrangement of mirrors by means of which the position of the exposure meter pointer is made visible in the view finder.

For this purpose, and as shown in FIGS. 1 and 4, the lid 2 of housing 1 is provided with a light admission window 13. Behind window 13, as also illustrated in FIG. 6, there is an oblique mirror 14 which deflects a beam of light 16 (FIG. 6), entering through an opening (not shown) in a lid 15 (FIG. 4) of the camera, through the pane 9 and onto pointer 7. As shown more particularly in FIGS. 1, 2, and 6, a support 18 for a mirror 19 is fastened to a side wall of housing 1 below the window 8, by screw 17, mirror 19 deflecting the beam of light 16 to a view finder (FIGS. 4 and 6).

Figure 7:
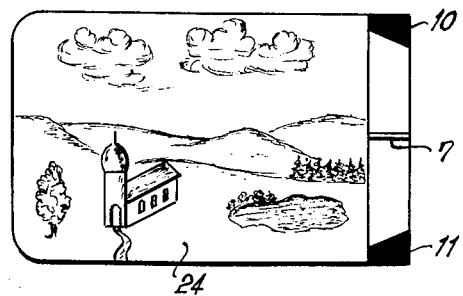
FIG. 7 illustrates the view seen in the view finder with the arrangement of FIG. 6.

View finder 20 comprises a glass block in which there is cemented a glass body 21 having a toric lens surface 22 and a surface 23 provided with a reflective coating. Toric lens 22 effects sharp focusing of pointer 7 and pane 9 into the eye of a viewer, to which the mirrored surface 23 deflects light ray 16. An eye peering into the view finder 20 sees the picture shown in FIG. 7. It will be noted that, on one side of the field of the view finder image 24, the pointer 7 and the colored end zones 10 and 11 of pane 9 can be observed.

Figure 2:
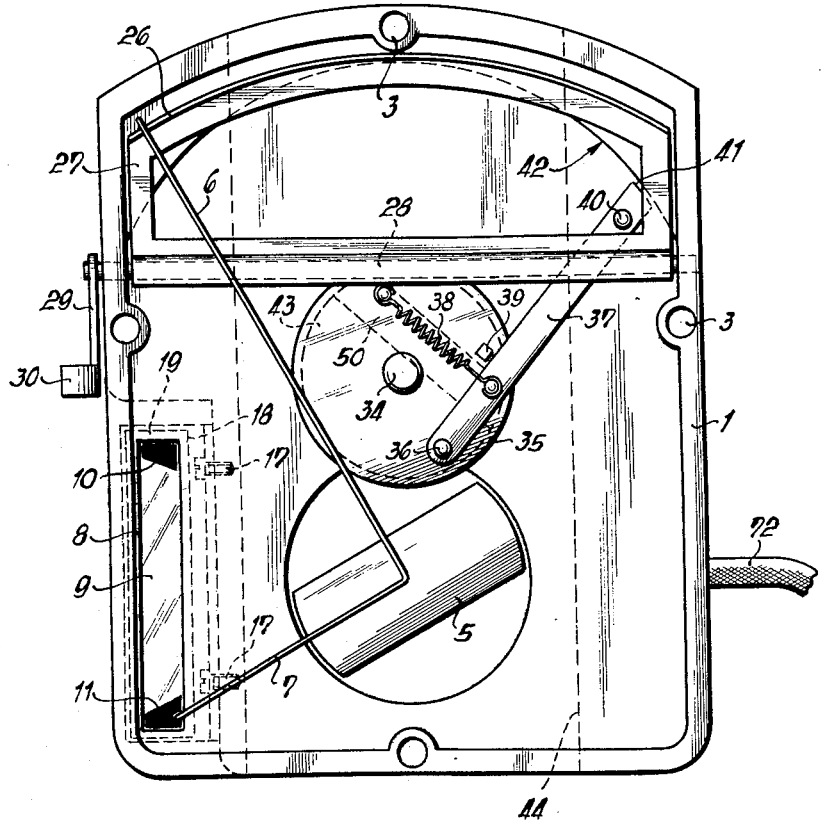
FIG. 2 is a top plan view of the housing shown in FIG. 1, with the lid or cover of such housing removed.

The free end of pointer 6, over its entire range of movement, moves between a fixed clamping surface 25 in lid 2 of housing 1 and a bent front edge 26 of an oscillatably mounted clamping strap 27, as best seen in FIG. 3. Clamping strap 27 is secured to a shaft 28 oscillatably mounted in a bearing conjointly formed by housing 1 and its cover 2. As best seen in FIGS. 1, 2, and 4, a lever arm 29 is secured to the end of shaft 28, which projects out of housing 1, and arm 29 has a bent lug 31 on its free end. As shown in FIG. 4, lug 30 has its lower edge cooperable with a pin 31 projecting from a shutter release key 32. In the drawings, key 32 is shown in its depressed position just releasing the shutter. A tension spring 33 biases lever arm 29 toward pin 31 so that lug 30 is maintained in continuous engagement with pin 31. This results in a rotation of shaft 28, and thus of clamp 27, in accordance with movements of release key 32 and its pin 31. Upon depression of release key 32, the rotation of shaft 28 is effected in a direction to move the free edge of clamp 27 toward surface 25 so that the free end of pointer 6 is clamped between edge 26 of clamp 27 and the surface 25. Upon return motion of shutter release key 32, which may be effected by a compression spring (not shown), the pin 31 acts on the lug 30 in a direction to rotate shaft 28 to swing edge 26 of clamp 27 away from pointer 26 and thus release the free end of the pointer from its clamping between edge 26 and shutter 25. The force exerted by the compression spring on the shutter release key exceeds the force exerted by tension spring 33 on lever 29.

The device for sensing the instantaneous position of the clamped pointer 6 is best illustrated in FIGS. 2 and 3. A shaft 34 rotatably mounted in housing 1 has a disk 35 on one end thereof. A sensing lever 37 is oscillatably mounted on a pin eccentrically positioned on disk 35, and a relatively light spring 38, secured between disk 35 and sensing lever 37, biases the sensing lever to engage a stop 39 secured to disk 35. The free end of sensing lever 37 has extending therefrom a sensing pin 40 which extends into the path of movement of the free end of pointer 6. At a slight distance from the free end surface 41 of sensing lever 37, there is provided a surface 42, in housing 1, and this surface extends at right angles to the plane of movement of sensing lever 37 and in a circular path concentric with shaft 34.

In sensing the position of pointer 6, the disk 35 turns counterclockwise from its position shown in FIG. 2, and the end surface 41 of sensing lever 37 moves parallel to the surface 42. When sensing pin 40 engages pointer 6, which is clamped at its light value indicating position in the manner described above, the movement of the outer end of lever 37 is interrupted. However, and as described hereinafter, the disk 35 continues to turn counterclockwise, so that stop 39 moves away from lever 37 against the force of the light tension spring 38. Since lever 37 is pivotal on the bolt 36 which is mounted eccentrically on the disk 35, lever 37, upon such further counterclockwise rotation of disk 35, will be moved substantially longitudinally of itself toward the surface 42 so that its end surface 41 will engage surface 42. With suitable design of the surfaces 41 and 42, there will thus occur a wedging of the sensing lever 37 against the surface 42, thus preventing any further counterclockwise rotation of disk 35. The clamped pointer 6 which, in any event had only to resist the pressure exerted by the sensing pin 40 due to the relatively light force of the light spring 38, is thus relieved of any further pressure against itself.

The degree of rotation of shaft 34 in sensing the position of pointer 6 is a measure of the amount by means of which a setting means for the camera shutter must be adjusted. This setting means can be, for example, the exposure value setting means of the shutter coupled with the diaphragm and shutter speed setting means. However, it is also possible to utilize the turning movement of shaft 34 to set the shutter time or the diaphragm setting means. In the particular embodiment of the invention illustrated more in detail in FIGS. 4 and 5, the diaphragm setting means of the lens of the camera is adjusted in correspondence with the movement of shaft 34.

For this purpose, there is provided, in association with the shaft 34, means for converting the non-linear movement of this shaft, corresponding to linear changes in light value, into linear adjustment of the diaphragm setting means in accordance with such linear changes in light value. This coupling means includes a coupling disk 43 secured to the opposite end of shaft 34 and, as best seen in FIG. 1, disposed within a tunnel 44 formed in the outer bottom surface of housing 1. When housing 1 is fastened to the camera body 12, a longitudinally slidable setting slide 46, slidably mounted on camera body 12 by means of pin and slot connections 45, lies within the tunnel 44. A pin 47 secured to slide 46 rotatably mounts a preferably circular plate 48 having a coupling rib 49 projecting from its upper surface, this coupling rib preferably extending diametrically of the axis of pin 47. Coupling rib 49 has mating engagement in a groove 50 extending across the bottom surface of disk 43 parallel to a diameter of its axis of rotation but radially off-set from such axis.

The relation between the linear movement of setting slide 46 and the resultant rotary movement of the coupling disk 43 is dependent on the distance, at any particular time, between the pivotal axes of circular plate 48 and coupling disk 43, and furthermore on the position which coupling rib 49 and its mating groove 50 assume with respect to the pivoting axis of their respective supports 48 and 43.

The coupling arrangement illustrated in FIGS. 4 and 5, by means of which the distance between the axes of rotation of disk 43 and plate 48 can be adjusted, results in equal increments of movement of setting slide 46 effecting unequal increments of movement of coupling disk 43. This is best illustrated by the scale 51 shown, only in order to clarify the explanation of the operation of the coupling, as opposite the setting slide 46, and the scale 52 shown, only for illustrating the operation of the coupling, as opposite the coupling disk 43. It will be noted that the graduations of scale 51 are equal, whereas those of scale 52 are unequal. For example, the graduations between the scale values "5" and "9" of scale 52 and the graduations between the values "5" and "1" of scale 52 are unequal to each other. The graduation of the scale 52 corresponds to the deflection characteristic of the pointer 6 of the exposure meter, whereas the graduations of scale 51 correspond to the movement of the diaphragm setting device.

As shown in FIGS. 4 and 5, slide 46 is formed with a rack 53 engaging a pinion 54 which is connected with the film advance or transport mechanism of the camera, this mechanism not being shown in detail. This connection is of such a nature that, upon each advance of the film, the setting slide 46 is moved, against the bias of a spring 55, into one end position, for example the left end position as shown in FIG. 5. A recess 56 is formed in the bottom edge, as viewed in FIG. 5, of the slide 46 and, at the limit of movement of slide 46 to the left, as shown in FIG. 5, a pawl 57 mounted in body 12 and spring biased, engages end recess 56 so as to lock slide 46 in its set position. Coupling disk 43, as well as disk 35 which is rigidly connected to disk 43, and the sensing lever 37 supported on disk 35, then assume the initial position shown in FIG. 2.

Pawl 57 is arranged to be engaged by a wedge cam surface 58 on the shutter release key 32 so that, upon actuation of key 32, pawl 57 is released from engagement with notch 56. Setting lever 46 also has a lug 59 bent at an angle therefrom and having its front edge formed with a rack 60 engaged with a pinion 61 on a shaft 63 projecting from the rear wall of shutter housing 62. In a manner forming no part of the present invention, shaft 63 is connected with the setting means of an iris diaphragm in the shutter housing, so that the iris diaphragm is opened and closed in accordance with rotation of shaft 63.

In shutter housing 62, there is supported a shutter speed ring 65 which can be rotatably adjusted with respect to a stationary scale 64 and which includes, in the part of the ring lying within housing 62, an annular wedge 66 of variable light transmission properties. The light transmission properties of wedge 66 vary in the direction of rotation of ring 65. A second ring 67, supported in housing 62, is adjustable in accordance with a film speed scale 68 on the housing and carries, in the part of the ring disposed within the housing 62, an annular variable light transmitting wedge 69 graduated in the direction of rotation of ring 67. A honey-comb or lenticular lens 70 in the front wall of shutter housing 62 permits light to fall on the wedges 66 and 69, known as "gray" wedges, and to pass through these wedges onto a light-sensitive cell 71 connected by a cable 72 with the exposure meter in the housing 1. Cable 72 is also shown in FIGS. 1 and 2.

The arrangement described above operates in the following manner. After a film has been placed in a camera and, upon its advance to the first picture area by means of the rotation of gear 54 resulting in rotation of rack 53, setting slide 46 is moved to its extreme left position in which it is locked by pawl 57 engaging in notch 56. The device sensing the position of pointer 6 of the exposure meter is then in the position shown in FIG. 2, while the iris diaphragm in the shutter housing 62 has been operated by means of rack 60 and pinion 61 to one limit of its range of movement. Depending upon the desired conditions, this position can be either the fully open position or the smallest aperture position. Setting ring 67 is now set in accordance with the speed of the film used, for instance to the value "18 DIN." With this setting, a field of the wedge 69 adapted to this value of film speed is interposed between lens 70 and cell 71. Ring 65 is then turned to adjust the shutter speed for a value which would appear to be suitable for the intended picture to be taken, for example "1/60 sec." This results in a field of wedge 66, adapted to this shutter speed value, being interposed between lens 70 and cell 71. When cell 71 is exposed to the light from the scene to be photographed, it has an electrical output resulting in a deflection of pointers 6 and 7 of the exposure meter, which deflection is dependent upon the film speed and the exposure time. The wedges 66 and 69, in association with cell 71, and the exposure meter, are so correlated that the deflection of pointer 6 constitutes a measure of the diaphragm value to be set.

The deflection of the exposure meter can be observed by looking into the view finder of the camera, from the corresponding position of pointer 7. If pointer 7 is at some place in the region between the colored end zones 10 and 11, this means that a photograph is possible with the prevailing light conditions, shutter speed, and film speed. If pointer 7 is, however, within the green zone 10, then an overexposed picture would be obtained upon release of the shutter. By setting a shutter speed, for instance "1/250 sec.," a portion of wedge 66 less permeable to light than the previous portion can be caused to be interposed between lens 70 and cell 71, as a result of which pointer 7 has a smaller deflection and then is outside the colored zone 10.

However, if pointer 7 extends into the red zone 11, as observed in the view finder, then an underexposed picture will be obtained upon the release of the shutter. In this case, a longer shutter speed, for instance "1/30 sec." must be set, in which case a portion of wedge 66 which is more permeable to light than the previous portion is interposed between lens 70 and cell 71. If, despite the resultant greater deflection, the pointer 7 is still within the colored zone 11, this indicates that, under the prevailing light conditions, a photograph is still not possible even with this longer shutter speed. Consequently, the photographer either must forget about the picture or else select a still longer shutter time (exposure time) to result in the pointer 7 lying in the region between the colored zones 10 and 11.

Upon actuation of shutter release key 32, pointer 6 is first clamped fast in its position indicating the measured light value. Immediately thereafter, and upon further depression of release key 32, setting slide 46 is released by pawl 57 and is drawn to the right by spring 55. As a result of this movement of slide 46, coupling disk 43 is turned to rotate the shaft 34, disk 35, and lever 37. Rotation of coupling disk 43, and thus of the setting circular plate 46, is arrested when sensing lever 47 becomes wedged against surface 42 as element 40 engages lever 6. In this manner, the setting of the iris diaphragm, coupled for linear scale movement with setting slid 46, is also effected, so that the iris diaphragm is now set at a value which is adapted to the prevailing light conditions and takes into consideration the shutter speed selected and the speed of the film.

While specific embodiments of the invention have been shown and described in detail to illustrate the application of the invention principles, it will be understood that the invention may be embodied otherwise without departing from such principles.

What is claimed is:

1. In combination with a still photographic camera having an exposure condition setting means adjustable linearly with respect to linear changes in light values, and a shutter release key operable, upon actuation, to release the shutter: an exposure meter including an indicating element movable non-linearly with respect to linear changes in light value; means operable, immediately upon and responsive to the start of actuation of said shutter release key, to arrest said indicating element against movement in its indicating position; a sensing device operable, upon actuation of said shutter release key and immediately subsequent to operation of said arresting means, to sense the position of said indicating element; a rotatable drive shaft coupled to said sensing device and having a rotary movement corresponding to such non-linear movement of said element; a slide mounted for longitudinal reciprocation in said camera; and a relatively elongated link having one end pivotally connected to a fixed point of said slide, said link being coupled to said shaft, for rotation therewith and simultaneous longitudinal sliding movement relative to said shaft in a plane perpendicular to the shaft axis, to reciprocally translate non-linear movement of said sensing device and said drive shaft, corresponding to linear changes in light values, into linear movement of said setting means, corresponding to such linear changes in light values.

2. The combination claimed in claim 1 in which said link is coupled to the said shaft eccentrically of the axis thereof.

3. The combination claimed in claim 1 in which said link comprises a support member pivoted to said slide; and a relatively elongated rectilinear rib on the outer surface of said support member and projecting radially beyond said support member for slidable and non-rotatable coupling to said shaft.

4. The combination claimed in claim 3 including a circular disk secured to the end of said shaft and having a rectilinear slot in its outer surface receiving said rib.

5. The combination claimed in claim 4 in which said slot extends chordally of said disk.

6. The combination claimed in claim 1 in which the exposure condition setting means is rotatable and the camera includes a film advance mechanism having a rotatable member; a first pinion rotatable with said setting mechanism; a second pinion rotatable with said member; said slide having a pair of rack formations respectively engaged with said first and second pinions; a spring biasing said slide toward one limit of its reciprocation; operation of the film advance mechanism to advance the film moving the slide, against the tension of said spring, to the other limit of its reciprocation; latch means operable, upon movement of said slide to such other limit, to engage said slide and retain it at such other limit; the movement of said slide to such other limit effecting rotation of said drive shaft to move said sensing means to one limit of its movement; and means on said latch means engageable by said shutter release key, upon actuation thereof and immediately after operation of said arresting means, to release said slide for movement by said spring toward such one limit of its reciprocation to rotate said drive shaft to move said sensing device to sense the indication of said indicating element.

7. The combination claimed in claim 1 in which said sensing device includes a circular disk secured to rotate with said drive shaft; a relatively elongated sensing lever pivotally connected, at one end, eccentrically to said disk and projecting from said disk; a tension spring connected between said disk and said lever and biasing said lever to swing in the direction of rotation of said disk in sensing the position of said indicating element; a stop on said disk engageable by said lever to limit movement of said lever under the influence of said tension spring; a sensing component on said lever adjacent the free end thereof and projecting into the path of movement of said indicating element for engagement thereof; means forming a curved surface concentric with said drive shaft and substantially co-planar with said sensing lever, said curved surface being spaced slightly from the free end of said sensing lever when the latter is engaged with said stop; said sensing lever, upon rotation of said drive shaft to sense the position of said indicating element, moving with said disk until said component engages said indicating element; said sensing lever thereupon swinging away from said stop, upon further slight rotation of said drive shaft and disk, to move outwardly and abut said curved surface to wedge thereagainst to arrest movement of said disk and said drive shaft.

8. The combination claimed in claim 7 in which said indicating element is a pointer and said component is a pin projecting from the free end of said lever substantially perpendicularly to the plane of movement thereof.

References Cited in the file of this patent

UNITED STATES PATENTS

| | | |
|---|---|---|
| 2,061,909 | Karg | Nov. 24, 1936 |
| 2,188,820 | Riszdorfer | Jan. 30, 1940 |
| 2,206,626 | Blechner | July 2, 1940 |
| 2,838,985 | Burger | June 17, 1958 |
| 2,923,216 | Greger | Feb. 2, 1960 |

FOREIGN PATENTS

| | | |
|---|---|---|
| 806,416 | France | Sept. 21, 1936 |